United States Patent
Batley et al.

(10) Patent No.: US 12,554,536 B2
(45) Date of Patent: Feb. 17, 2026

(54) SHARED CONTROL BUS FOR GRAPHICS PROCESSORS WITH INTRA-SUBSTRATE AND CROSS-SUBSTRATE INTERFACES

(71) Applicant: Apple Inc., Cupertino, CA (US)

(72) Inventors: Max J. Batley, London (GB); Jonathan M. Redshaw, St. Albans (GB); Ji Rao, London (GB); Ali Rabbani Rankouhi, Bushey (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/493,993

(22) Filed: Oct. 25, 2023

(65) Prior Publication Data

US 2024/0054014 A1 Feb. 15, 2024

Related U.S. Application Data

(63) Continuation of application No. 17/158,943, filed on Jan. 26, 2021, now Pat. No. 11,847,489.

(51) Int. Cl.
*G06F 9/38* (2018.01)
*G06F 9/48* (2006.01)
(Continued)

(52) U.S. Cl.
CPC .......... *G06F 9/4881* (2013.01); *G06F 9/3877* (2013.01); *G06F 9/505* (2013.01);
(Continued)

(58) Field of Classification Search
None
See application file for complete search history.

(56) References Cited

U.S. PATENT DOCUMENTS 6,237,058 B1  5/2001  Nakagawa
8,890,562 B1*  11/2014  Hartanto ........ G01R 31/318513
                                                      324/762.06

(Continued)

FOREIGN PATENT DOCUMENTS

TW   201417035 A   5/2014
TW   201729122 A   8/2017
TW   201935262 A   9/2019

OTHER PUBLICATIONS

Office Action in ROC (Taiwan) Pat. Appln. No. 112129416 mailed Feb. 29, 2024, 5 pages.

(Continued)

*Primary Examiner* — Abu Zar Ghaffari
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to a shared control bus for communicating between primary control circuitry and multiple distributed graphics processor units. In some embodiments, a set of multiple graphics processor units including at least first and second graphics processors on different semiconductor substrates that are packaged in a multi-chip module, where the first and second graphics processors are coupled to access graphics data via respective memory interfaces. The shared workload distribution bus may include: one or more interfaces between respective graphics processors on the same semiconductor substrate and at least one cross-substrate interface between the different semiconductor substrates. Workload distribution circuitry may transmit, via the shared workload distribution bus, control data that specifies graphics work distribution to the multiple graphics processor units. Packet control circuitry may (Continued)

modify packets from at least one of the one or more interfaces for transmission via the cross-substrate interface.

17 Claims, 14 Drawing Sheets

(51) Int. Cl.
  *G06F 9/50* (2006.01)
  *G06F 9/54* (2006.01)
  *G06F 13/36* (2006.01)
  *G06F 13/37* (2006.01)
  *G06F 13/40* (2006.01)
  *G06F 13/42* (2006.01)
(52) U.S. Cl.
  CPC .............. *G06F 9/544* (2013.01); *G06F 9/545* (2013.01); *G06F 13/36* (2013.01); *G06F 13/37* (2013.01); *G06F 13/4022* (2013.01); *G06F 13/4282* (2013.01); *G06F 9/5027* (2013.01)

(56) References Cited

U.S. PATENT DOCUMENTS

| | | | |
|---|---|---|---|
| 9,349,610 B2 * | 5/2016 | Whang | .................. H01L 25/18 |
| 9,372,800 B2 * | 6/2016 | Akkawi | .............. G06F 12/0833 |
| 9,559,961 B1 | 1/2017 | Sorenson et al. | |
| 10,089,145 B1 | 10/2018 | Priescu et al. | |
| 2006/0248360 A1 | 11/2006 | Fung | |
| 2009/0259612 A1 | 10/2009 | Hanson | |
| 2013/0019033 A1 | 1/2013 | Shima | |
| 2013/0141442 A1 * | 6/2013 | Brothers | ................... G06T 1/20 345/502 |
| 2014/0219276 A1 * | 8/2014 | Jokinen | ................... H04L 47/62 370/392 |
| 2015/0012679 A1 | 1/2015 | Davis et al. | |
| 2017/0060808 A1 | 3/2017 | Randell | |
| 2017/0278445 A1 * | 9/2017 | Nishiguchi | .............. G09G 3/36 |
| 2018/0174996 A1 * | 6/2018 | Mostovoy | ............... H01L 21/56 |
| 2018/0300841 A1 | 10/2018 | Schluessler et al. | |
| 2019/0272615 A1 | 9/2019 | Koker et al. | |
| 2019/0324759 A1 | 10/2019 | Yang et al. | |
| 2020/0012531 A1 * | 1/2020 | Li | ......................... G06F 9/5088 |
| 2020/0043123 A1 | 2/2020 | Dash et al. | |
| 2020/0098160 A1 | 3/2020 | Havlir et al. | |
| 2020/0294178 A1 * | 9/2020 | Anantaraman | ........ G06F 9/3877 |
| 2020/0401542 A1 | 12/2020 | Li | |
| 2021/0149729 A1 | 5/2021 | Wang et al. | |
| 2022/0051994 A1 * | 2/2022 | Pang | ..................... H01L 25/165 |

OTHER PUBLICATIONS

Office Action in Taiwanese Appl. No. 111103314 mailed Nov. 28, 2022, 7 pages.

International Search Report and Written Opinion in PCT Appl. No. PCT/US2022/013461 mailed May 2, 2022, 15 pages.

* cited by examiner

Transmit, via a shared workload distribution bus to a first graphics processor of multiple graphics processing units, control data that specifies graphics work distribution, where:
- the control data is distinct from the graphics data accessed by the graphics processing units via respective memory interfaces and
- the shared workload distribution bus connects the workload distribution circuitry to a second graphics processor and connects the first graphics processor to the second graphics processor such that the transmitting the control data to the first graphics processor is performed via the shared workload distribution bus connection to the second graphics processor

1010

Transmit control data from ones of the multiple processor units to the workload distribution circuitry via the shared workload distribution bus

SHARED CONTROL BUS FOR GRAPHICS PROCESSORS WITH INTRA-SUBSTRATE AND CROSS-SUBSTRATE INTERFACES

The present application is a continuation of U.S. application Ser. No. 17/158,943, entitled "Shared Control Bus for Graphics Processors," filed Jan. 26, 2021, the disclosure of which is incorporated by reference herein in its entirety.

BACKGROUND

Technical Field

This disclosure relates generally to graphics processors and more particularly to a shared control bus for communicating with multiple graphics sub-units.

Description of the Related Art

As graphics processors increase in processing capabilities, resources such as shader cores, geometry pipelines, texture processing units, etc. are often replicated to process parts of a graphics workload in parallel. Front-end control circuitry such as workload schedulers may dispatch various types of work (e.g., compute work, vertex work, and pixel work) to different processors or GPU sub-units, which may in turn generate completion signaling to indicate that assigned work has been finished.

BRIEF DESCRIPTION OF THE DRAWINGS

FIG. 10 is a flow diagram illustrating an example method for communicating using a shared control bus, according to some embodiments.

DETAILED DESCRIPTION

Figure 1A:
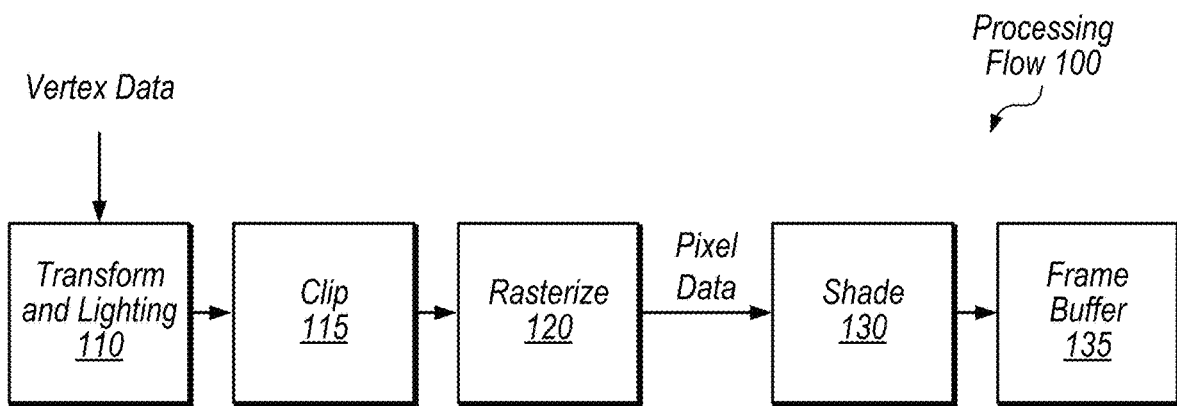
FIG. 1A is a diagram illustrating an overview of example graphics processing operations, according to some embodiments.
Figure 1B:
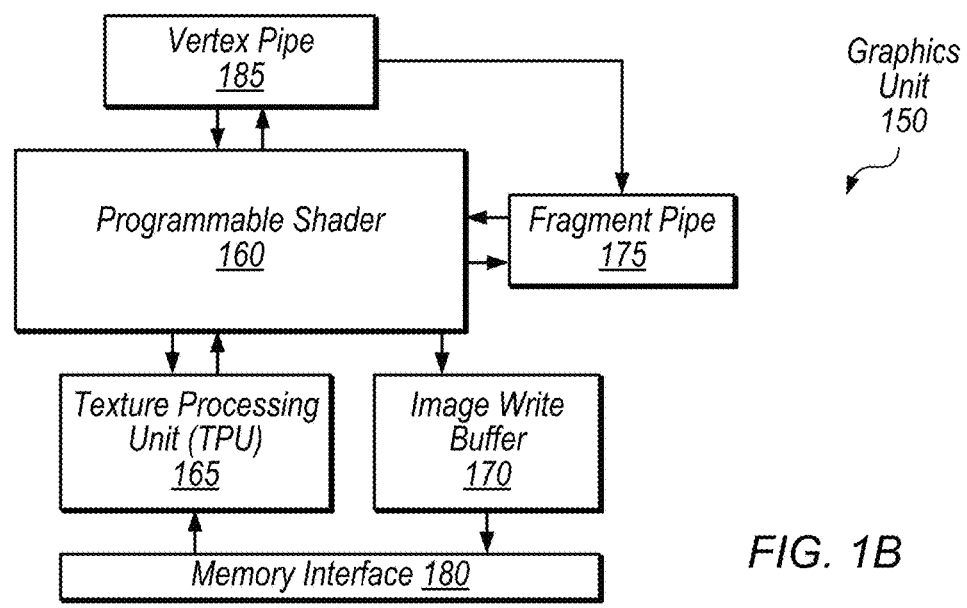
FIG. 1B is a block diagram illustrating an example graphics unit, according to some embodiments.
Figure 2:
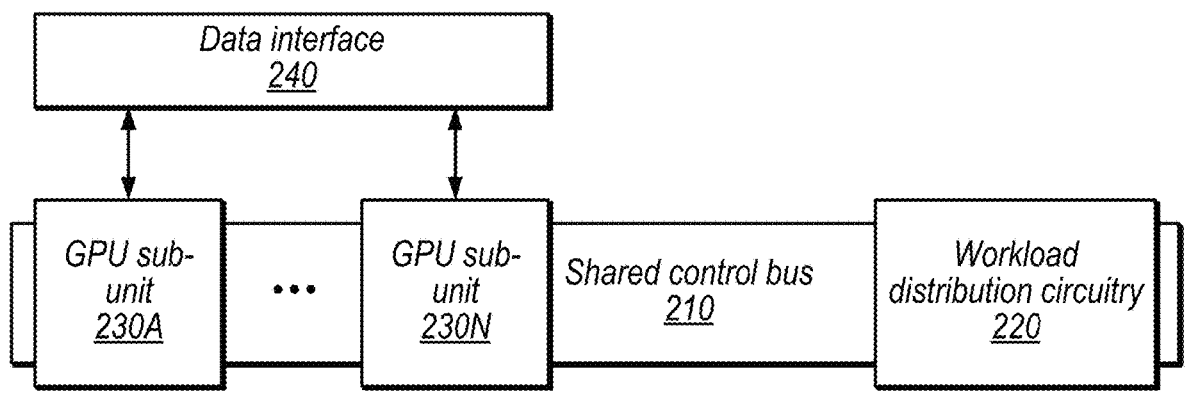
FIG. 2 is a block diagram illustrating an example shared control bus, according to some embodiments.
Figure 3:
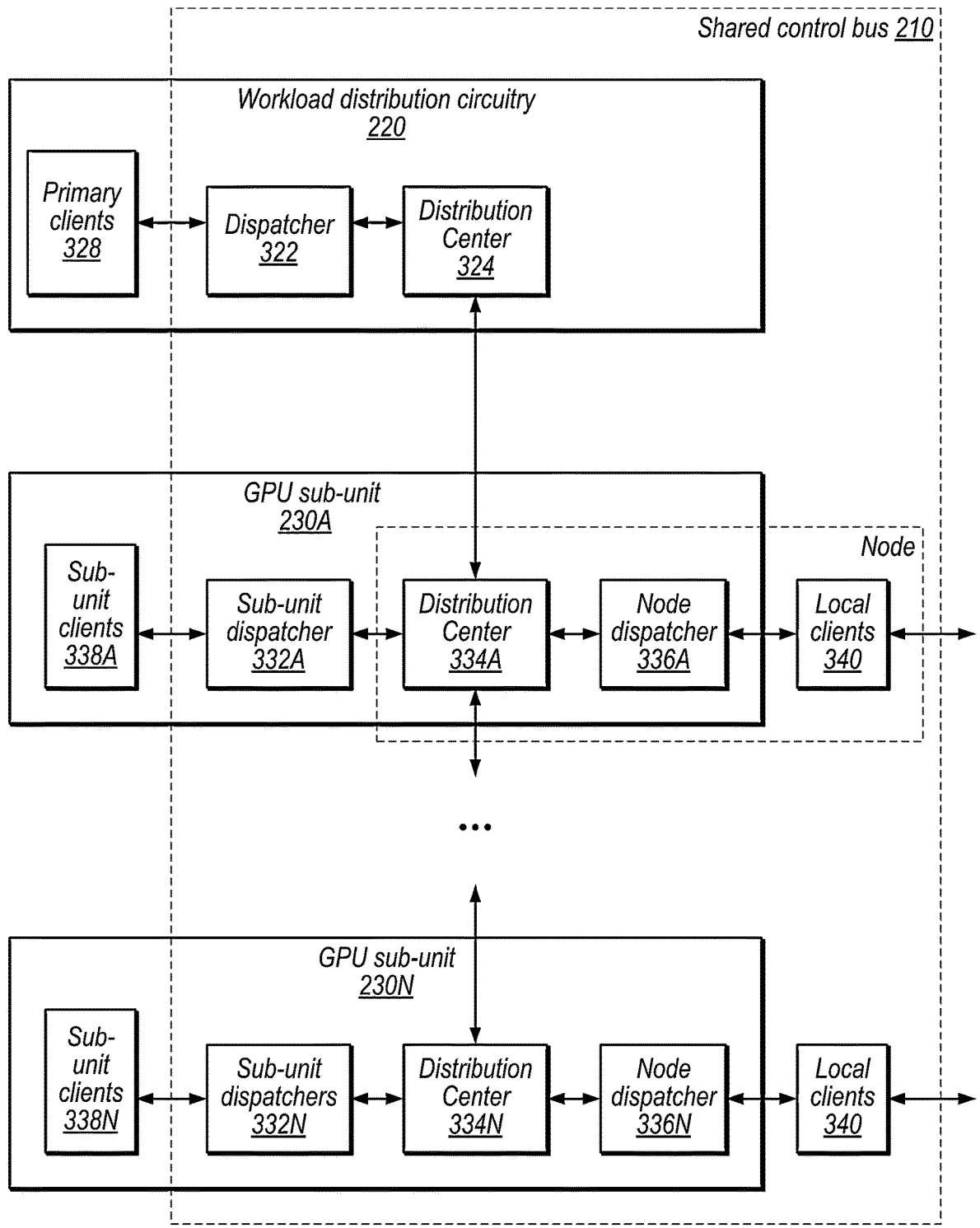
FIG. 3 is a block diagram illustrating a detailed example control bus with node and dispatcher circuitry, according to some embodiments.
Figure 4:
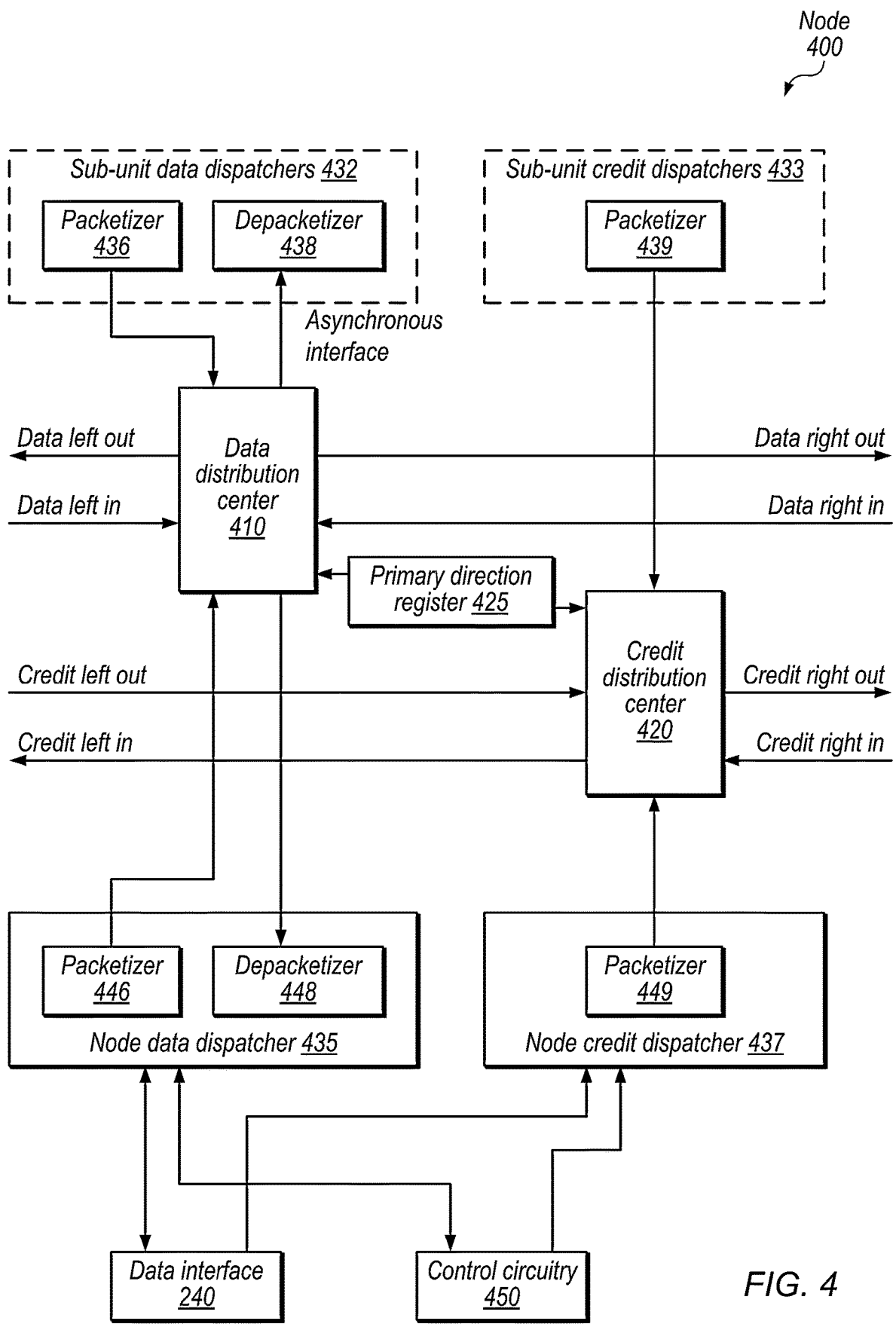
FIG. 4 is a block diagram illustrating an example node, according to some embodiments.
Figure 5:
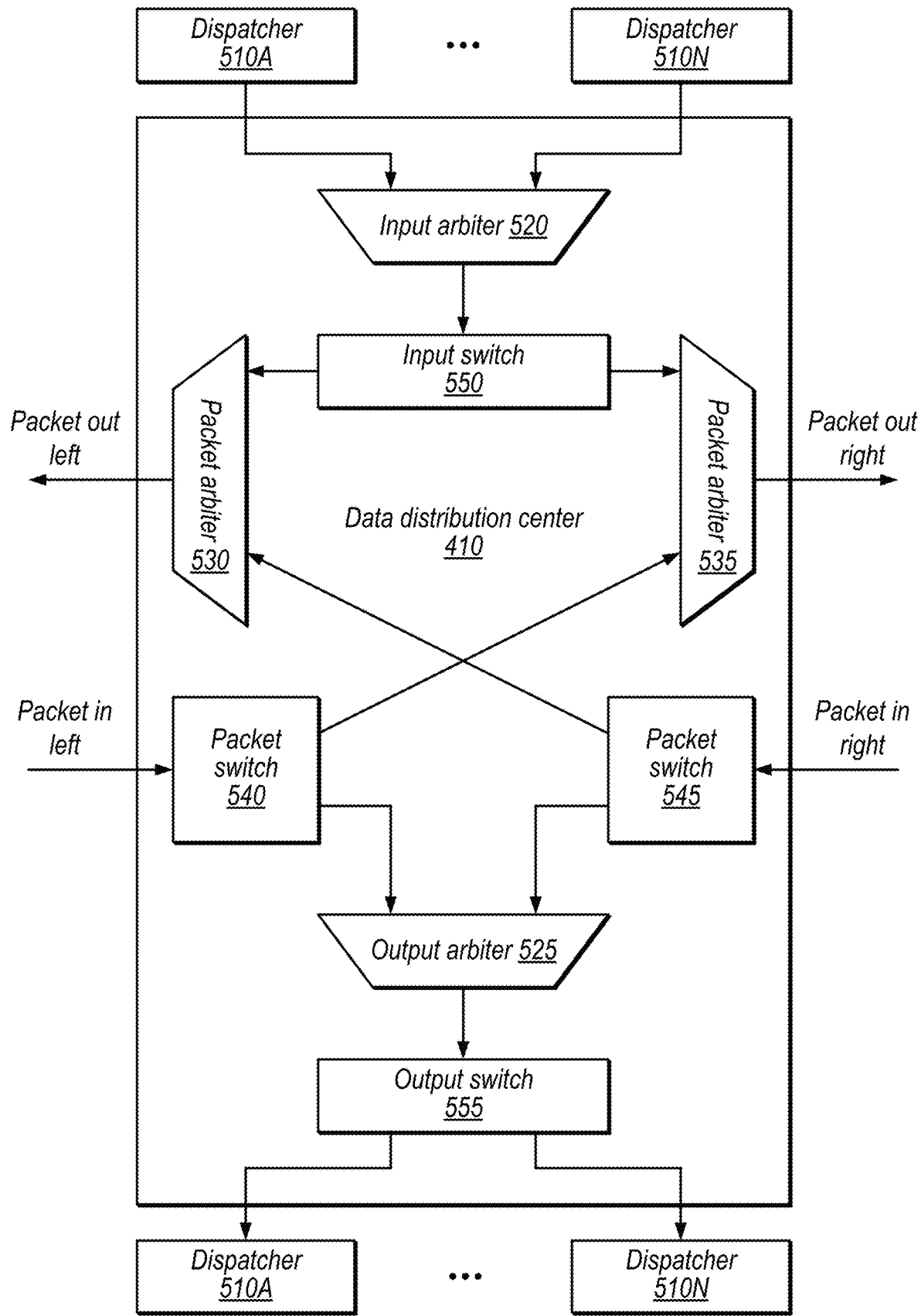
FIG. 5 is a block diagram illustrating an example data distribution center in a node, according to some embodiments.
Figure 6:
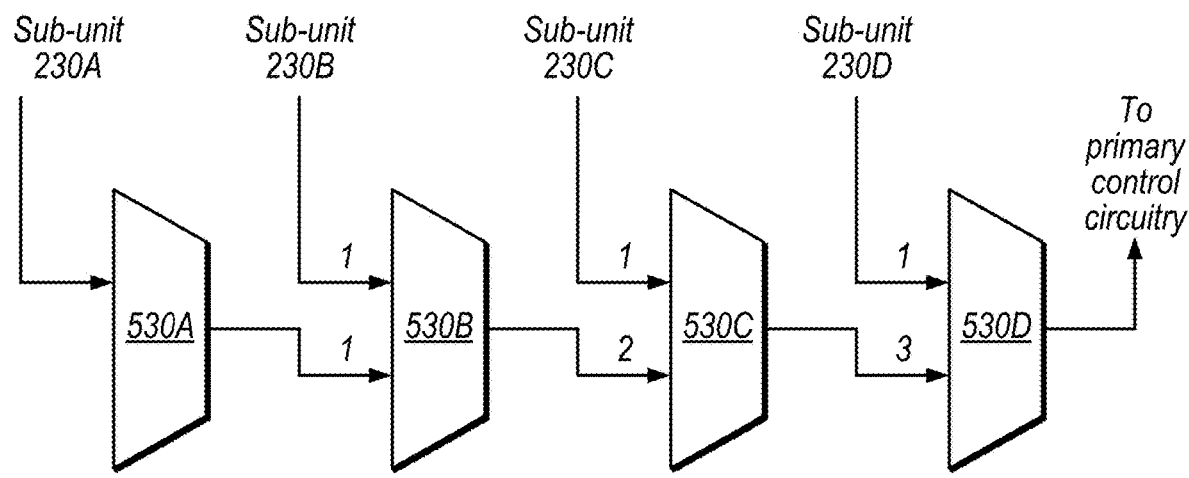
FIG. 6 is a block diagram illustrating example arbitration circuitry, according to some embodiments.
Figure 8:
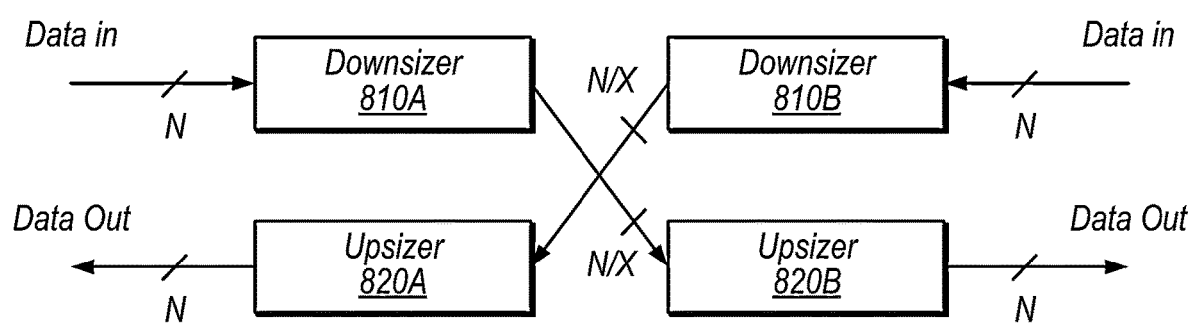
FIG. 8 is a block diagram illustrating example packet upsizer and downsizer circuitry, according to some embodiments.
Figure 9:
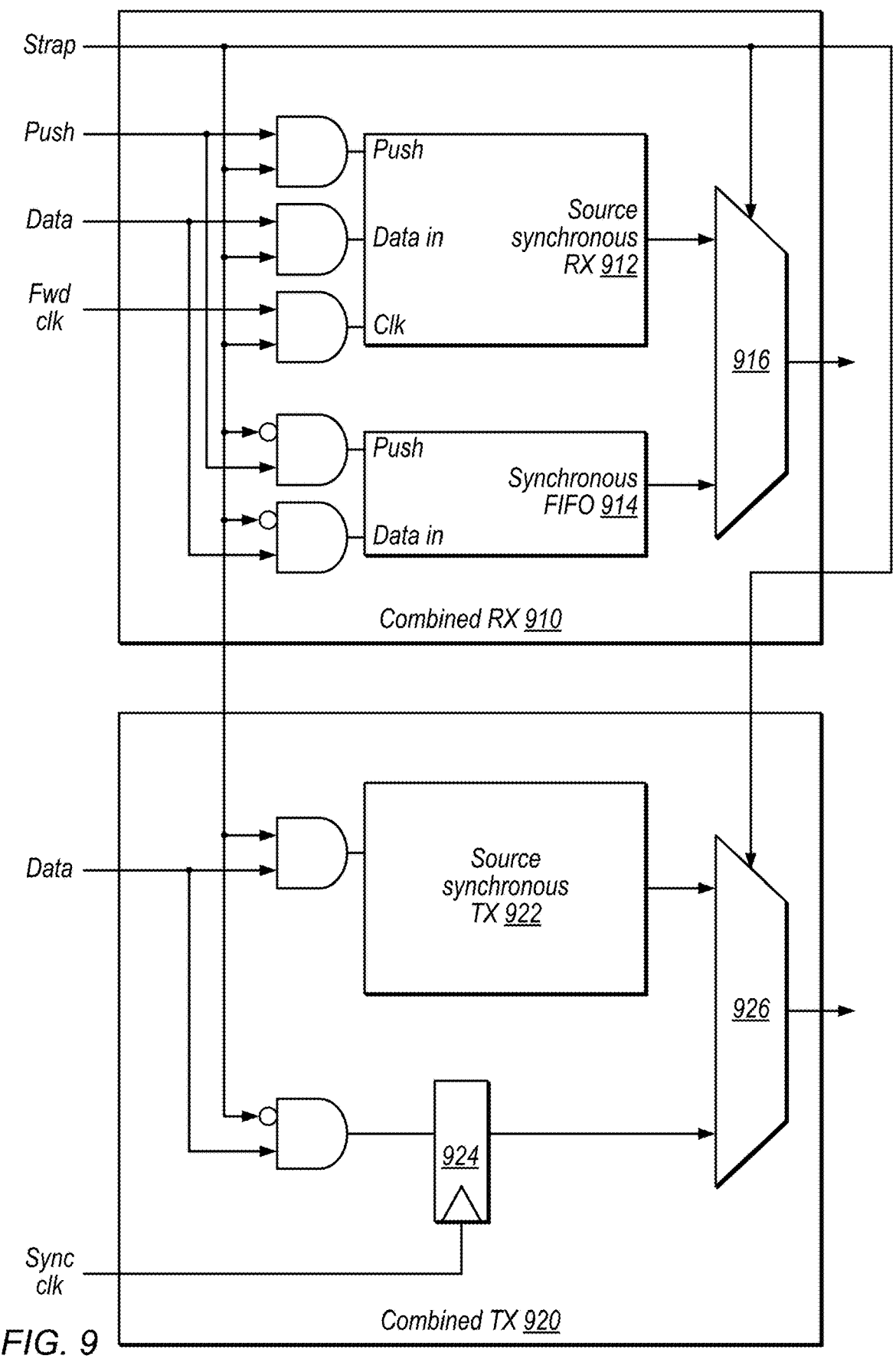
FIG. 9 is a circuit diagram illustrating example combined receiver and transmitter circuitry for source synchronous and synchronous channels.
Figure 11:
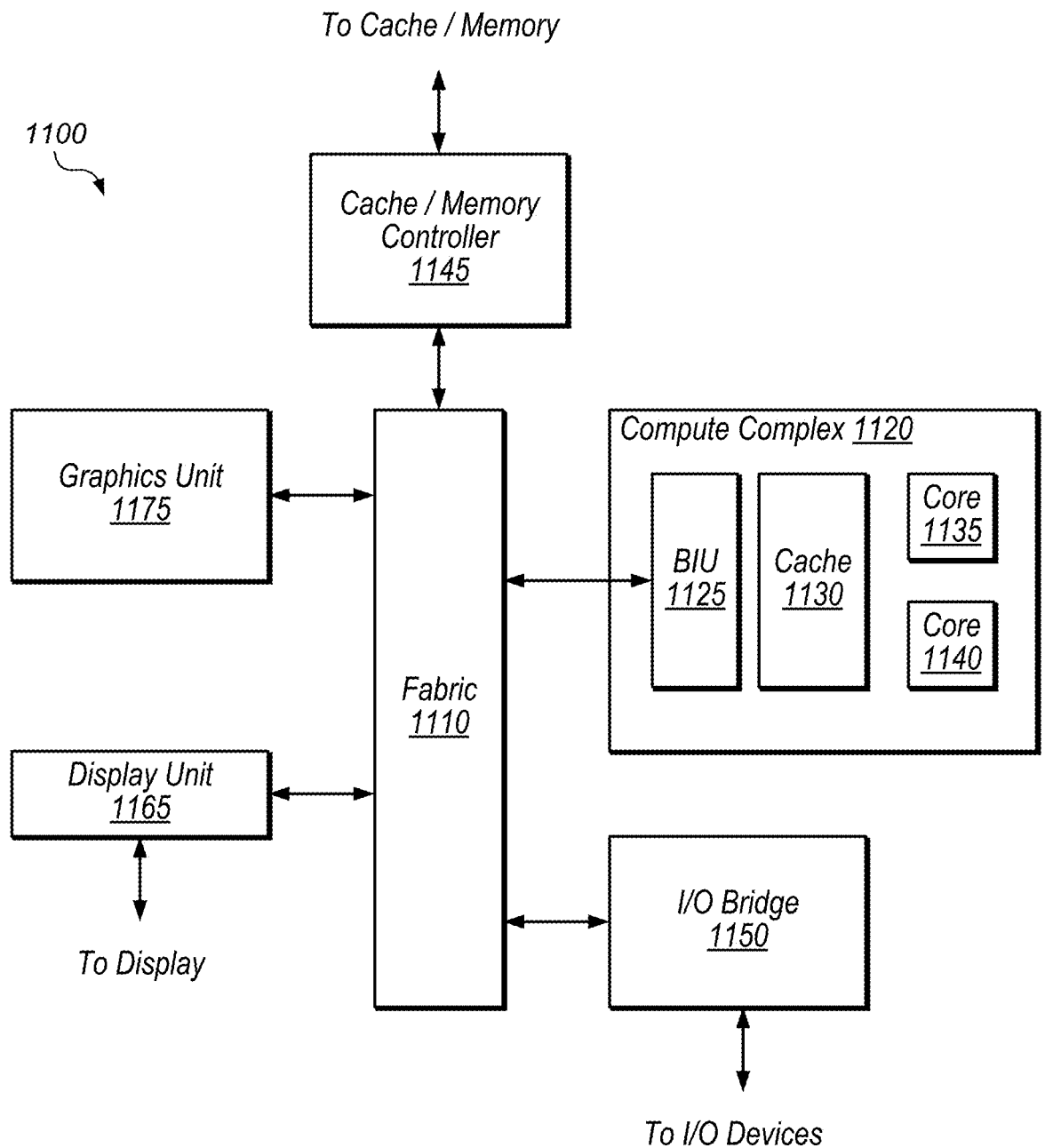
FIG. 11 is a block diagram illustrating an example computing device, according to some embodiments.
Figure 12:
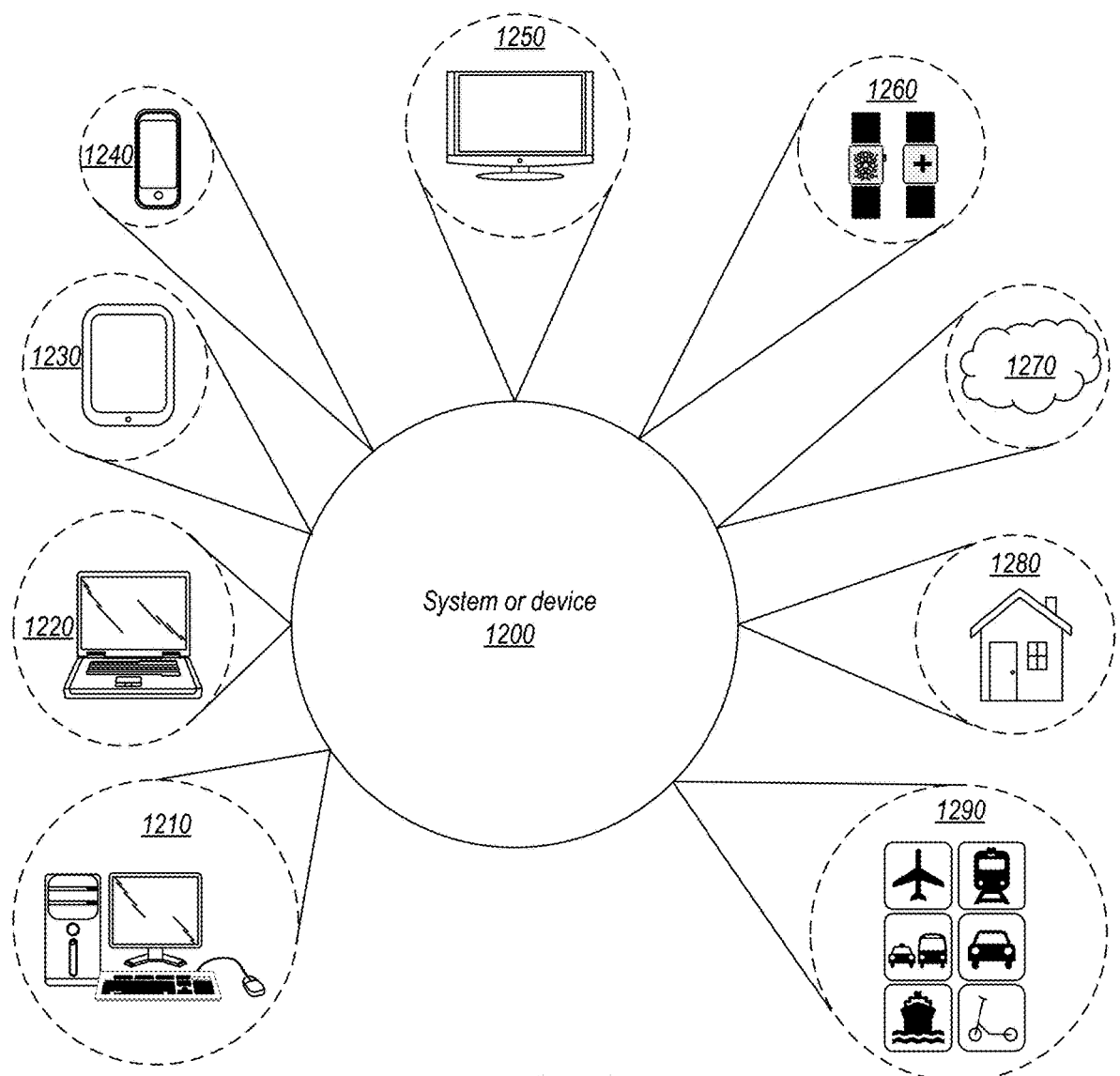
FIG. 12 is a diagram illustrating example applications of disclosed systems and devices, according to some embodiments.

This disclosure initially presents an overview of graphics processors and processing techniques with reference to FIGS. 1A-1B. FIGS. 2-3 provide example shared control bus embodiments. FIGS. 4-5 provide example internal circuitry for control bus nodes. FIG. 6 provides example circuitry configured to arbitrate among local and non-local traffic. FIGS. 7-9 provide example circuitry for embodiments with GPU sub-units on different dies. FIGS. 10-12 provide example methods, computer systems, devices, and integrated circuit design information. In various embodiments, the disclosed circuitry and techniques may efficiently distribute compute work among distributed GPU resources in a manner that is scalable across devices with different numbers of instantiated components.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In some embodiments, all or a portion of the elements of FIG. 1B are instantiated multiple times in a graphics processor. In these embodiments, primary control circuitry may control the various instantiations, e.g., using a shared control bus as discussed in detail below.

Overview of Shared Control Bus

In some embodiments, a shared control bus provides point-to-point communication between global clients associated with primary control circuitry and distributed clients in multiple GPU sub-units (which may be replicated in a given design). In some embodiments, a single global client for a GPU communicates with multiple corresponding distributed clients in replicated GPU sub-units (although a distributed client may also communicate with multiple global clients, in some implementations). For example, primary workload distribution circuitry (such as compute control circuitry, vertex control circuitry, pixel control circuitry, etc.) may communicate with distributed control circuitry in multiple shader cores to distribute graphics work to the shader cores. Note that the shared control bus used to assign graphics work is distinct from a data bus used to access the graphics data to be processed as part of the assigned work, in some embodiments.

In the context of compute work, the global workload distribution circuitry may send control information that identify batches of workgroups from a compute kernel that are assigned to different shader cores. The distributed workload distribution circuitry may assign workgroups for execution by a shader core's processing hardware and then may use the control bus to notify the global workload distribution circuitry when work is finished.

The control bus may have a chain or ring topology in which the bus connects adjacent sub-units and passes control data along the chain or ring until reaching a targeted sub-unit. Similarly, messages that target the control circuitry may be passed along the chain or ring until reaching the control circuitry. Disclosed techniques may allow global clients to control multiple different GPU sub-units in an efficient and scalable fashion. The control bus may advantageously allow scaling of sub-units on a given semiconductor substrate or across multiple substrates (e.g., in multi-chip module implementations). For example, disclosed shared bus circuitry may be implemented in devices with two GPU cores as well as devices with much larger numbers of cores.

In some embodiments, the control bus provides all or a portion of the following features: arbitration among sub-units, priority based on distance a workload distribution node, packet aggregation, synchronous, source-synchronous, and asynchronous connections between components, credit management, up/down-sizing of packets for certain links, and ordering among certain types of control data.

The disclosed bus structure may allow scaling to various numbers of GPU sub-units and global workload distribution circuits (although in some embodiments, at most one global workload distribution circuit is allowed to be active at a given time). Each node may know its own local identifier, which may be configured by input wires such that a GPU sub-unit component may be synthesized and used for multiple sub-unit instances. Each sub-unit may be unaware of its position in the overall layout, other than top level control using input wires (e.g., of the node identifier and arbitration multiplexing). Various components related to the bus may communicate via synchronous, source synchronous, or asynchronous communications.

FIG. 2 is a block diagram illustrating an example shared control bus, according to some embodiments. In the illustrated embodiment, shared control bus 210 connects workload distribution circuitry 220 with multiple GPU sub-units 230A-230N. Workload distribution circuitry 220 may send control messages that specify processing work assigned to GPU sub-units 230, which may respond with completion signaling (and potentially other types of return signaling such as acknowledgment or status signaling, in some embodiments).

The GPU sub-units 230, in this example, have connections to a separate data interface 240 which they may use to access data for assigned graphics processing work. For example, data interface 240 may be included in a cache/memory hierarchy accessible to different elements of the device.

A GPU sub-unit 230 may be a scaling unit that may be replicated for more powerful GPUs. Each GPU sub-unit 230 may be capable of independently processing instructions of a graphics program. Therefore, the control bus 210 may be utilized in embodiments with a single GPU sub-unit or scaled in embodiments with much larger numbers of GPU sub-units. In some embodiments, each sub-unit 230 is a processor that includes fragment generator circuitry, shader core circuitry configured to execute shader programs, memory system circuitry (which may include a data cache and a memory management unit), geometry processing circuitry, and distributed workload distribution circuitry (which may receive work from primary workload distribution circuitry 220 and distributed the work within a GPU sub-unit 230). In some embodiments, programmable shader 160 includes multiple sub-units 230. In other embodiments, programmable shader 160 is a GPU sub-unit 230 and graphics unit 150 includes multiple programmable shaders 160 and corresponding support circuitry.

In the illustrated example, the shared control bus is organized using a serially-connected structure in which each GPU sub-unit connected to the shared workload distribution bus is directly connected to at most two other processor units via the shared control bus. Note that the actual connections between nodes on the bus typically include parallel lines for transmitted packets, so the serial arrangement does not imply serial transmission of packet data (although large client messages may be split into multiple packets that are transmitted serially, in some embodiments and situations). The illustrated serial connection between nodes may result in a chain structure with two ends. In other embodiments, nodes may be coupled in a ring topology. In other embodiments, various appropriate connection topologies may be utilized based on connections between sets of sub-units.

Workload distribution circuitry 220, in some embodiments, is connected to other elements of a system on a chip (SoC), e.g., via a fabric. Workload distribution circuitry 220 may receive work for GPU sub-units from other elements of the SoC, such as compute work from a central processing unit, for example. In some embodiments, workload distribution circuitry 220 processes graphics kicks to distribute work for GPU sub-units. Workload distribution circuitry may also include control circuitry for clock management and power management, may implement a firmware processor, may route events and interrupts, and may provide access to software and firmware accessible GPU registers.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kick slot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, the shared control bus 210 simulates point-to-point connectivity between a global client and distributed clients, such that one pair of clients may be unaware of other clients connected to the bus. Global clients may include a destination mask and distributed clients may include a source identifier in responses in order to properly identify the target/source distributed client in a pair. Messages from distributed clients may be inferred to target a global client. In other embodiments, messages from distributed clients may specify one of multiple potential target global clients.

The shared control bus 210 may provide certain ordering features among client pairs. For example, the shared control bus 210 may guarantee first-in first-out (FIFO) ordering for messages sent between client pairs, but may not provide ordering between different clients from a given GPU sub-unit or among different GPU sub-units. In some embodiments, a global client may target multiple distributed clients using a multi-cast message (e.g., by specifying multiple distributed targets in a destination mask). In these embodiments, the ordering in which messages will be received by each distributed client may not be guaranteed, but the shared control bus 210 may ensure that each distributed client will receive messages in the same order that they were sent.

In some embodiments, the shared control bus 210 provides quality of service using arbitration between clients at each node when packetizing and between new packets and packets already on the bus. The latter technique may use a weighted round-robin scheme that prioritizes packets already on the bus. Head-of-line blocking may occur when a packet is behind another packet whose target client is not ready to receive it. If clients limit back-pressure on the network, however, the maximum latency and minimum bandwidth for each client may be bounded. Clients may limit or avoid back-pressure using a credit system.

Exampled Detailed Embodiments of Shared Control Bus

FIG. 3 is a block diagram illustrating a detailed example control bus with node and dispatcher circuitry, according to some embodiments. In the illustrated embodiment, shared control bus 210 includes a node for each GPU sub-unit 230 as well as sub-unit dispatcher circuitry 332 (which may be on a different clock and power domain than the corresponding node). Each node, in the illustrated example, includes a distribution center 334, a node dispatcher 226, and an interface for local clients 340.

In the illustrated embodiment, workload distribution circuitry 220 includes a distribution center 324, a dispatcher 322, and one or more primary clients 328. Distribution center 324 may receive control packets from GPU sub-unit distribution centers 334 and communicate data that targets primary (e.g., global) clients 328 via dispatcher circuitry 322.

Each GPU sub-unit node, in the illustrated example, is configured to receive packets from one or both directions in a chain arrangement via a distribution center 334. The distribution center 334 may forward packets that do not target the current sub-unit or route packets to a node dispatcher 336A or sub-unit dispatcher 332A if the current sub-unit is targeted.

Node dispatcher 336, in some embodiments, is configured to communicate with local clients 340, which may include an interface to access registers of data interface 240, which may connect to a communications fabric. The communications fabric may have relaxed ordering and relatively high throughput, e.g., for media traffic. Local clients 340 may also include circuitry configured to act as a coherence point for atomic operations. The interface to atomic circuitry may support flush requests, for example. Local clients 340 may also include distributed control circuitry (e.g., which may control power and clock management and may include distributed workload distribution circuitry configured to allocate workload within a GPU sub-unit. Sub-unit dispatchers 332, in the illustrated embodiments, are configured to communicate control signaling to clients within the sub-unit. In some embodiments, communications between distribution center 334 and sub-units 332 are asynchronous, e.g., due to the sub-unit clients 338 being implemented in different power or clock domains. Examples of sub-unit clients 338 include memory hierarchy control circuitry such as a memory management unit, geometry-tiling processors, or both.

More detailed examples of distribution center and dispatcher circuitry are provided below with reference to FIGS. 4-6.

FIG. 4 is a block diagram illustrating an example node, according to some embodiments. In the illustrated embodiment, node 400 includes data distribution center 410, credit distribution center 420, primary direction register 425, node data dispatcher 435, node credit dispatcher 437, data interface 240, and control circuitry 450. As shown, data distribution center 410 may communicate with sub-unit data dispatchers 432 and credit distribution center 420 may communicate with sub-unit credit dispatchers 433.

Data distribution center 410, in some embodiments, is configured to receive and send control packets via a left interface and a right interface respectively coupled to adjacent nodes. Using packets may avoid wiring for dedicated crossbars between client pairs. Client requests may be packetized at the boundary of the shared control bus network and de-packetized at the receiver client. In some embodiments, messages are posted and do not generate a response (rather, if a message from workload distribution circuitry 220 requires a response, it is up to the distributed client to generate a response message as a new transaction in these embodiments).

In particular, the illustrated left and right interfaces may communicate with adjacent nodes in a chain of nodes of the bus. In some embodiments, data distribution center 410 uses a source synchronous bus in both directions. In some embodiments, one direction may implement a synchronous bus, e.g., when adjacent nodes in the chain are implemented on different dies. In "source synchronous" communications, the device sending the data signals sources the reference clock (e.g., strobe signaling) for the communications. In contrast, for synchronous communications, a global clock may provide a reference clock signal. Therefore, a global clock may be used for timing of communications across dies while a source clock may be used for communications within a die, in some embodiments (although note that source synchronous communications may also be used for communications within a given die).

Primary direction register 425, in some embodiments, indicates the direction of primary control circuitry such as workload distribution circuitry 220. In embodiments with multiple instances of primary circuitry, primary direction register 425 may indicate the direction of the currently-active primary control circuitry. In some embodiments, primary direction register 425 may include a single bit to indicate the direction. Data distribution center 410 and credit distribution center 420 may use the direction to determine which way to send packets. In embodiments with a single instance of primary circuitry or in which hardware can statically determine the active workload distribution circuitry 220, the primary direction register may be removed or hardwired.

Note that although some embodiments described herein have at most one set of global circuitry active at a given time for a set of GPU sub-units connected using a shared control bus, other embodiments may have multiple sets of global circuitry active at once (e.g., multiple active workload distribution circuits 220). In these embodiments, each node may actively communicate with at most one global workload distribution circuit 220, but different nodes may have different global workload distribution circuits 220 active at a given time. In these embodiments, each node may maintain an identifier of its currently-active workload distribution circuit 220 and may pass this identifier to the shared control bus for proper routing of its out-bound packets.

Node data dispatcher 435 and sub-unit data dispatchers 432 are configured to packetize received control data and de-packetize control packets from data distribution center 410 for distributed clients. Packetization, in some embodiments, includes taking message from a client over a client interface (which may be different for different clients) and encapsulating messages for sending over the shared control bus. Packets may include data to be conveyed and control information (e.g., to indicate source and destination). In some embodiments, the shared control bus supports different types of packets for control data and for credits. In some embodiments, control data packets include a payload, a payload mask indicating whether portions of the payload are valid, client identifiers, a direction (e.g., from primary control circuitry to a GPU sub-unit or vice versa), a destination mask field, and a burst length field. Credit packets may include a credit field (which may indicate a credit count and a kick-slot identifier for resources assigned to a corresponding graphics kick), a GPU sub-unit identifier, and a client identifier.

In some embodiments, dispatcher circuitry is also configured to aggregate multiple data messages into a packet. This may reduce latency due to packet contention and increase utilization of the shared control bus. In some embodiments, packetizer circuitry 436 and 446 performs aggregation. In some embodiments, each packet includes one or more lanes and requests from each client use a client's designated lane (or all lanes if the client uses the full width of the shared control bus). In other embodiments, clients may be dynamically assigned to different lanes. For example, if client A and client B both use half of the bus and both have messages available, packetizer circuitry may aggregate both message into different lanes of the same packet.

In some embodiments, clients may submit messages that are larger than the maximum packet width. In these embodiments, the packetizer may split a request into multiple beats which are sent in successive packets as a burst. The de-packetizer may then recombine the packets into a single message for the destination client. The shared control bus may ensure that packets in the burst are sent without other packets interleaved. In these embodiments, each packet may include a burst length field which may indicate the number of beats still to come for the current burst.

In some embodiments, packetizer circuitry may also implement arbitration among clients of a given dispatcher for each implemented lane. Data distribution center 410 may then implement higher-level arbitration among dispatchers (as discussed below with reference to FIG. 5). This may allow fairness among clients while also allowing spare bandwidth to be used by filling in lanes that are un-used by clients that win higher-level arbitration. For burst packets, the arbitration circuitry may continue selecting packets from the same burst until the burst is complete.

Depacketizer circuitry 448 and 438, in some embodiments, receives packets from the network, parses the message data, and sends the data to relevant clients over client interfaces. If a packet includes data for multiple clients, the depacketizer may MUX relevant data for each client from the proper position in the packet and assert a valid signal to the targeted client. In embodiments with a valid/ready protocol for client interfaces, the shared control bus may present any data it has for a client whether or not the client is asserting a ready signal, e.g., because the client may depend on the valid signal to know that data is available. In some embodiments, once a client has accepted its data, the depacketizer no longer presents a valid signal to that client. Once all clients have accepted their portion of a packet, the depacketizer may move to the next packet.

Credit distribution center 420, in some embodiments, is configured to communicate credits using a separate credit network such that credit packets do not interfere with control data packets. Credit distribution center 420 may support synchronous and source synchronous communications, similarly to data distribution center 410. In other embodiments, credit packets may be transmitted on the same network as control packets.

In some embodiments, global clients in primary control circuitry are configured to maintain credit information indicating storage availability at corresponding distributed clients in GPU sub-units 230. Credit dispatchers 427 and 433 may handle credit updates from clients and credit distribution center may forward credit packets along the shared control bus chain. Credit dispatchers at the primary control circuitry may notify global clients of credit updates. Packetizers 439 and 449 may generate packets for credit updates, which may include combining multiple credit updates into one packet. A global client may avoid sending control data to a distributed client that has less than a threshold number of credits, until a credit update indicates that the distributed client has transaction storage available.

Data interface 240 and control circuitry 450 are examples of local clients 340, in some embodiments. In some embodiments, node data dispatcher 435 accesses control registers of data interface 240 while sub-unit clients access a memory hierarchy via data interface 240 itself. Control circuitry 450 may provide an interface to distributed workload distribution circuitry or fabric registers, for example.

FIG. 5 is a block diagram illustrating an example data distribution center, according to some embodiments. In the illustrated embodiment, data distribution center 410 is configured to communicate with one or more dispatchers 510 and includes input arbiters 52, output arbiter 525, input switch 550, packet arbiters 530 and 535, packet switches 540 and 545, and output switch 555.

Input arbiter 520, in some embodiments, is configured to receive packet data from multiple dispatchers and arbitrate between the dispatchers to provide a packet to input switch 550. Input switch 550, in some embodiments, is configured to appropriately route the selected packet to the left or to the right, e.g., based on the direction register 425. In the primary control circuitry, the input switch 550 may select direction(s) based on the destination mask and based on configuration (e.g., a tie-off input) that indicates which GPU sub-units are connected to each side of the distribution center 410. When packets are sent to both sides, their destination masks may be modified appropriately.

Packet arbiters 530 and 535, in the illustrated embodiment, are configured to arbitrate between packets generated locally by the GPU sub-unit (e.g., from dispatchers 510) and packets received via a packet switch 540 and 545 that do not target the illustrated node. FIG. 6 is described in detail below and provides an example arbitration technique that is based on distance of the node to the primary control circuitry.

Packet switches 540 and 545, in the illustrated embodiment, receive packet data from the left and right respectively and either pass the data along to the next node (via a packet arbiter) or send data that targets the illustrated node to output arbiter 525. Packet switches may inspect incoming packets to determine whether they should be routed to a local dispatcher or passed to the other side of the node. The handled packets may be from a distributed client to a global client from another GPU sub-unit or from a global client targeting one or more GPU sub-units. The former may always be passed to the next distribution center in the chain while the latter may be routed to a local dispatcher, an adjacent distribution center (or both in the case of a broadcast packet).

Output arbiter 525, in the illustrated embodiment, is configured to take packets from the left and right inputs to the distribution center and select between them to send to one or more dispatchers. In the primary control circuitry, this may use a round-robin arbiter. In GPU sub-units where data is only flowing one direction from the primary control circuitry, output arbiter 525 may simply accept received packets from the active side (in embodiments with primary control circuitry on each side of the chain) and may update the primary direction register 425 when the first packet from the non-active direction arrives.

Output switch 555, in the illustrated embodiment, is configured to route messages from the primary control circuitry to the appropriate dispatcher. Output switch 555 may inspect the client identifier of a packet to perform this routing. Packets may route to multiple dispatchers due to aggregation.

FIG. 6 is a block diagram illustrating example arbitration circuitry, according to some embodiments. In the illustrated example, four GPU sub-units 230A-230D include respective packet arbiters 530A-530D. In the illustrated example, sub-unit 230D is adjacent to the primary control circuitry in the chain and sub-unit 230A is furthest from the primary control circuitry. Each packet arbiter 530, in the illustrated embodiment, is configured to arbitrate between local packets and packets already on the bus from the other side of the node. In some embodiments, the primary control circuitry does not use packet arbiters, e.g., because all packets may either originate or terminate at the primary control circuitry (e.g., at workload distribution circuitry 220).

In the illustrated example, packets already on the network are given higher priority than new packets. Further, sub-units closer to the primary control circuitry give more weight to packets on the bus than sub-units further from the primary control circuitry. In particular, packet arbiter 530C is configured to select packets to provide a 2:1 ratio of packets already on the bus to local packets while packet arbiter 540D is configured to provide a 3:1 ratio of packets already on the bus to local packets. Note that the specific numbers of nodes and ratios of FIG. 6 are included for purposes of illustration but are not intended to limit the scope of the present disclosure. Rather, various ratios and numbers of nodes are contemplated. Further, other techniques for arbitration are also contemplated, in addition to or in place of the disclosed weighting techniques.

Exampled Multi-Substrate Embodiments

As briefly discussed above, in some embodiments GPU sub-units are included on different semiconductor substrates. For example, GPU sub-units may be implemented on different dies, different integrated circuits, different modules in a multi-chip-module device, different layers of a three-dimensional integrated circuit, different chips, etc. In some embodiments, the different circuit portions may have different clock domains, voltage domains, or both (and note that there also may be multiple different domains within each circuit portion).

Figure 7A:
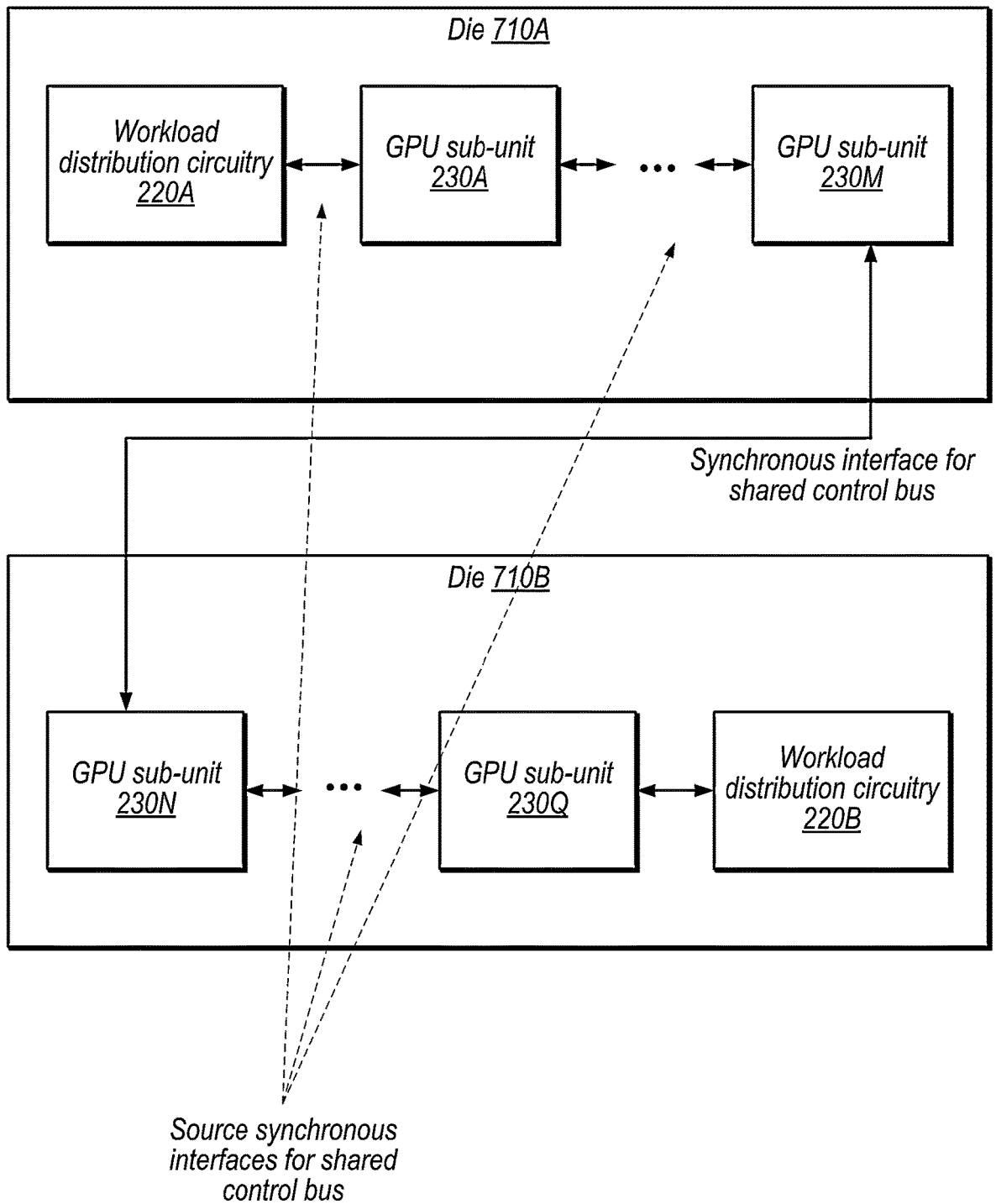
FIG. 7A is a block diagram illustrating example GPU sub-units on different dies, according to some embodiments.

FIG. 7A is a block diagram illustrating example GPU sub-units on different dies, according to some embodiments. In the illustrated embodiment, GPU sub-units 230A-230M are included on die 710A and GPU sub-units 230N-230Q are included on die 710B. In the illustrated embodiment, source synchronous interfaces are used to connect GPU sub-units within each die while a synchronous interface is used to connect GPU sub-units 230M and 230N.

In the illustrated example, the device includes two workload distribution circuits 220A and 220B. In some embodiments, at most one of these workload distribution circuits is enabled at a given time for dies 710A and 710B. For example, one workload distribution circuit may be permanently disabled during manufacturing, or one workload distribution circuit may be powered down or otherwise prevented from interfering with the active workload distribution circuit during operation.

Although two dies are shown in the illustrated example, various numbers of separate circuit portions and GPU sub-units per circuit portion are contemplated.

Figure 7B:
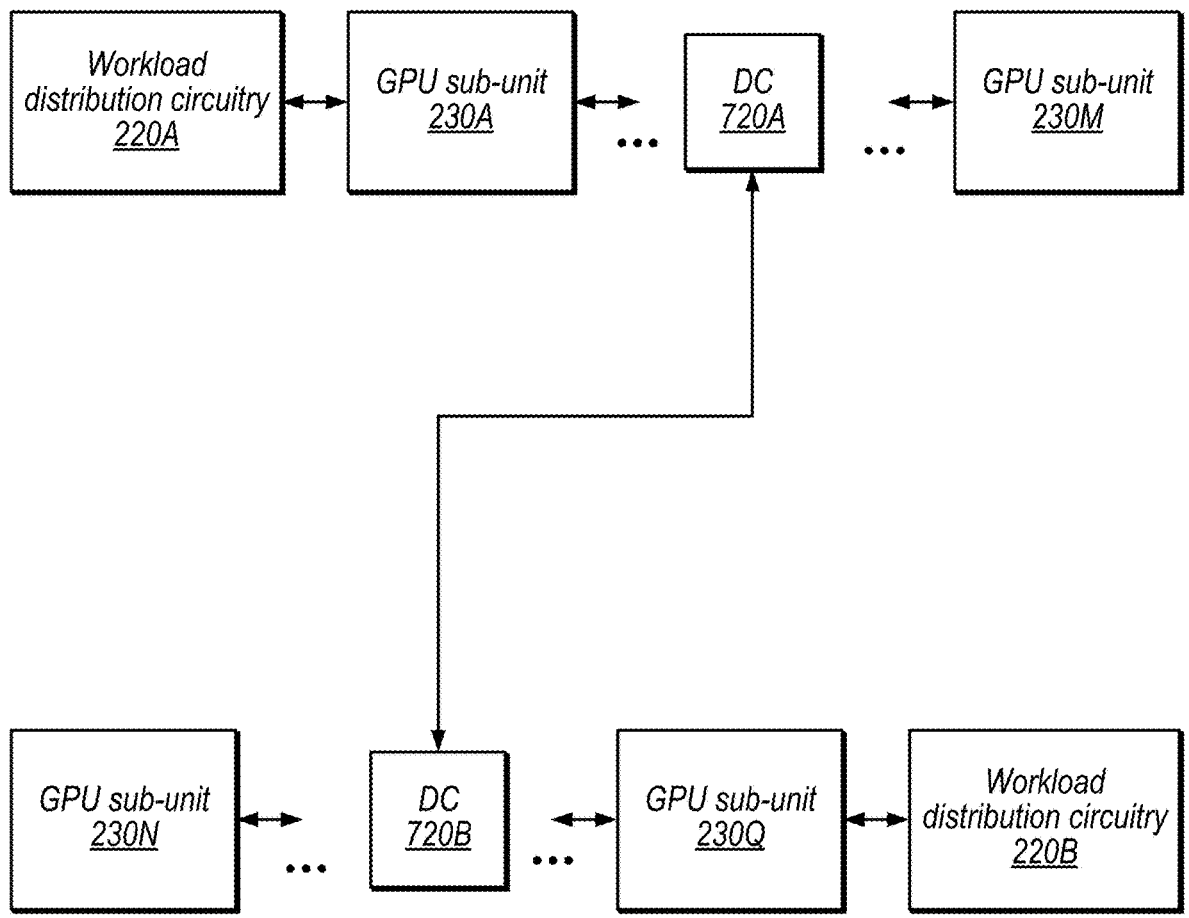
FIG. 7B is a block diagram illustrating an example non-serial control bus topology, according to some embodiments.

FIG. 7B is a block diagram illustrating an example non-serial control bus topology, according to some embodiments. In the illustrated example, the control bus includes distribution centers (DCs) 720A and 720B, which are configured to communicate control messages between each other. As shown, each of these DCs is included in the middle of a serial chain of control bus nodes for GPU sub-units 230. Therefore, in these embodiments, all nodes on the shared control bus are not arranged in a ring or chain topology. In embodiments in which at most one workload distribution circuit 220 is active at a given time, the DC for that serial chain may forward all messages targeting global circuitry to the other DC. In embodiments in which multiple workload distribution circuits 220 are allowed to be active at once, DCs 720A and 720B may route messages based on which workload distribution circuit 220 they target. For messages targeting distributed clients, a DC 720 may maintain direction information indicating which messages to send to another DC 720 and which messages to forward along its chain, e.g., based on identifiers of the target GPU sub-unit.

There may be varying numbers of DC 720's connecting different portions of a shared control bus topology, in various embodiments. For example, some embodiments may include three, four, or any appropriate number of DCs 720. The DC's 720 may be standalone distribution centers or may be included in a node of a GPU sub-unit 230. The DC's 720 may be located at various locations within a group of GPU sub-units, e.g., at or near one end of the group, in the middle of the group, etc. The groups of GPU sub-units connected by DC's 720 may be organized using various topologies; serial chains are discussed herein for purposes of explanation, but are not intended to limit the topologies used for the different groups.

In some embodiments, two or more DC's 720 communicate via a communication fabric that also carries other types of data (e.g., non-control data). For example, in embodiments in which DC 720A is on a different die than DC 720B, these DCs may use an existing high-bandwidth communication fabric to route control packets between different portions of the shared control bus. This may avoid dedicated wiring between dies for shared control bus communications, in these embodiments.

FIG. 8 is a block diagram illustrating example packet upsizer and downsizer circuitry, according to some embodiments. In the illustrated embodiment, a graphics processor includes downsizers 810A and 810B and upsizers 820A and 820B.

In some embodiments, it may be advantageous to reduce the number of wires in various portions of a device, such as between circuit portions (e.g., between dies). In some embodiments, bits of a given packet are transmitted in parallel between nodes (e.g., using N wires for an N-bit packet or N/M wires if a given packet is to be transmitted over M cycles). Therefore, in some embodiments, a graphics processor includes circuitry configured to split and downsize packets and circuitry configured to subsequently combine and upsize the packet portions. In the illustrated embodiment of FIG. 8, each packet is split into X portions. In this example, while the data in and data out buses include N wires, the wires between the downsizer/upsizer pairs include only N/X wires.

In some embodiments, downsize/upsize circuitry is included on each side of a circuit portion where wire reduction is advantageous. In some embodiments, the illustrated data in and data out buses are source synchronous while the buses from a downsizer to an upsizer are synchronous. In some embodiments, the data into a downsizer always matches the data out from an upsizer.

In some embodiments, downsized data packets include a payload of data to be transferred, a payload mask indicating whether portions of the payload are valid, client identifiers for each lane of a packet, a direction (e.g., global to distributed or distributed to global), a destination mask, an indication of whether the downsized packet was actually split or not, and one or more lane allocations (e.g., which lane in an upsized packet should contain all or a portion of the downsized packet).

FIG. 9 is a circuit diagram illustrating example combined receiver and transmitter circuitry for source synchronous and synchronous channels. In the illustrated example, both types of channels are implemented and the strap signal selects the desired functionality. This may allow multiple instances of the disclosed circuitry to be included, and the desired functionality selected based on a node's location within the chain structure of the shared control bus.

In the illustrated embodiment, the shared control bus includes combined receive (RX) circuit 910 and combined transmit (TX) circuit 920. In some embodiments, a combined RX circuit 910 is included for each data in and credit in line in FIG. 4, for example, and a combined TX circuit 920 is included for each data out line and each credit out line.

Combined RX circuit 910, in the illustrated embodiment, includes multiple logic gates, source synchronous receiver circuitry 912, synchronous first-in first-out (FIFO) 914, and multiplexer (MUX) 916. Source synchronous RX 912, in the illustrated embodiment, receives data via the data in port based the forwarded clock from the transmitter and the push signal (which may indicate that data is present). Synchronous FIFO 914 receives data based on the push signal and queues received data. MUX 916 selects the output from the active circuitry (based on the strap signal) and provides it to the node.

Combined TX circuit 920, in the illustrated embodiment, includes source synchronous TX circuitry 922 and gated latch 924. Source synchronous transmitter 922, in the illustrated embodiment, receives data to be transmitted and forwards the data to MUX 926. Latch 924 receives data based on a synchronous clock. MUX 926 selects an input from the active circuitry (based on the strap signal) to transmit to another node.

When the strap signal is high, in the illustrated embodiment, the source synchronous RX circuit 912 and the source synchronous TX circuit 922 are active and the synchronous FIFO 914 and latch 924 are disabled. When the strap signal is low, in the illustrated embodiment, the source synchronous RX circuit 912 and the source synchronous TX circuit 922 are disabled and the synchronous FIFO 914 and latch 924 are active. In some embodiments, a strap signal controls all circuitry 910 and 920 on one side of a node (e.g., all the "right" lines or all the "left" lines of FIG. 4). Including both types of channels for nodes may allow nodes the same circuitry to be instantiated for different GPU sub-units, regardless of where they are positioned, e.g., along the shared control bus chain. In some embodiments, the primary control circuitry supports only source synchronous communications for the shared control bus.

In some embodiments, components of the shared control bus are designed to be synthesized once and instantiated multiple times in a given device. Therefore, tie-offs such as the strap signal may be used for per-instance configuration. In some embodiments, communications between a node and one or more dispatchers are asynchronous, e.g., given that a node may be in a fabric power and clock domain and a dispatcher may be on a local GPU sub-unit clock and power domain, for example.

In some embodiments, the following physical design is implemented. The primary control circuitry and its shared control bus node are implemented in the same power and clock domain and communicate synchronously. The GPU sub-unit dispatcher is implemented in the GPU sub-unit power and clock domain and its shared control bus node is implemented in a fabric power and clock domain and communicate asynchronously. The GPU sub-unit local clients are also implemented in the fabric power and clock domain and communicate synchronously with its shared control bus node.

Example Method

FIG. 10 is a flow diagram illustrating an example method for communicating using a shared control bus, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, workload distribution circuitry transmits, via a shared workload distribution bus to a first graphics processor of multiple graphics processing units, control data that specifies graphics work distribution. In the illustrated embodiment, the control data is distinct from the graphics data accessed by the graphics processing units via respective memory interfaces. In the illustrated embodiment, the shared workload distribution bus connects the workload distribution circuitry to a second graphics processor and connects the first graphics processor to the second graphics processor such that the transmitting the control data to the first graphics processor is performed via the shared workload distribution bus connection to the second graphics processor. For example, referring to FIG. 3, GPU sub-unit 230N is one example of the first graphics processor and may communicate with workload distribution circuitry 220 (one embodiment of the workload distribution circuitry) via the bus connection to GPU sub-unit 230A (one example of the second graphics processor).

In some embodiments, the control data includes information indicating different workgroups distributed to the first and second graphics processors from a compute kernel.

At 1020, in the illustrated embodiment, ones of the multiple processor units transmit control data to the workload distribution circuitry via the shared workload distribution bus. Thus, the shared control bus may be bi-directional and may provide point-to-point communications between the workload distribution circuitry and clients of the processor units.

In some embodiments, the first and second graphics processors include respective arbitration circuitry (e.g., packet arbiters 530 and 535) configured to arbitrate between locally generated control data and control data generated by another processor unit connected to the shared workload distribution bus. In some embodiments, the arbitration circuitry is configured to prioritize control data from processor units that are further from the workload distribution circuitry on the workload distribution bus over locally generated control data (e.g., as shown in FIG. 6 for circuits 530C and 530D).

In some embodiments, the shared control bus is configured to aggregate multiple distinct requests from a client into a single packet of control data. In some embodiments, the shared control bus is configured to arbitrate both among requests to be aggregated into a packet (e.g., by packetizer circuitry 436 or 446) and among clients submitting requests to communicate with the workload distribution circuitry (e.g., by input arbiter 520). Thus, in some embodiments, there are at least three levels of arbitration: for inclusion in a packet, among packets from different clients, and among locally-generated packets and packets already on the bus.

In some embodiments, circuitry of the shared workload distribution bus between the first and second graphics processors includes both source synchronous and synchronous communications circuitry and wherein the apparatus is configured to use one of the source synchronous and synchronous communications circuitry based on a strap signal. FIG. 9 provides one example of such circuitry.

In some embodiments, the first and second processors are located in different semiconductor substrates. In some embodiments, all or a portion of the first and second processors are included in different power and clock domains. In some embodiments, a first portion of the shared workload distribution bus includes a first number of wires configured to transmit data in parallel and a second portion of the shared workload distribution bus includes a second number of wires configured to transmit data in parallel. In some embodiments, downsize circuitry is configured to split a packet transmitted by the first portion of the shared workload distribution bus into multiple packets for transmission by the second portion of the shared workload distribution bus.

In some embodiments, the shared workload distribution bus is configured to implement flow control using a credit management system, where packets that communicate credit information (e.g., on a credit network between credit distribution centers 420) are distinct from packets that communicate control data (e.g., on a network between data distribution centers 410).

In some embodiments, the shared workload distribution bus supports both packets that target a single processor unit and packets that target multiple processor units. In some embodiments, the multiple processor units are arranged along the shared workload distribution bus according to a serial topology such that each processor unit connected to the shared workload distribution bus is directly connected to at most two other processor units via the shared workload distribution bus.

In some embodiments, nodes of the shared workload distribution bus include: an input switch for control data from the processor unit, an output switch for control data for the processor unit, packet switches configured to receive packets from other processor units on the shared workload distribution bus, and a direction register configured to store an indication of a direction to the workload distribution circuitry via the shared workload distribution bus. In some embodiments, the shared workload distribution bus provides ordering of packets between pairs of processor units connected to the shared workload distribution bus.

In some embodiments, the first and second graphics processors include separate respective: fragment generator circuitry, shader core circuitry, memory system circuitry that includes a data cache and a memory management unit, geometry processing circuitry, and distributed workload distribution circuitry.

In some embodiments, multiple graphics processor units are arranged along the shared workload distribution bus according to at least two groups (e.g., in FIG. 7B, GPU sub-units 230A through 230M are one example group and GPU sub-units 230N through 230Q are another example group), connected by distribution center circuitry (e.g., circuitry 720) located between graphics processor units in ones of the at least two groups. In some embodiments, the distribution center circuitry included in at least two different groups is configured to communicate between the two different groups via a communications fabric that is shared with non-control data.

Example Device

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Graphics unit 1175 may include one or more processors, e.g., one or more graphics processing units (GPU's). Graphics unit 1175 may receive graphics-oriented instructions, such as OPENGL®, Metal, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 1175 includes multiple GPU sub-units and control circuitry configured to communicate with the sub-units via the disclosed shared control bus.

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and inter-integrated circuit (I2C), for example. Various types of peripherals and devices may be coupled to device 1100 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1100 with connectivity to various types of other devices and networks.

Example Applications

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 13:
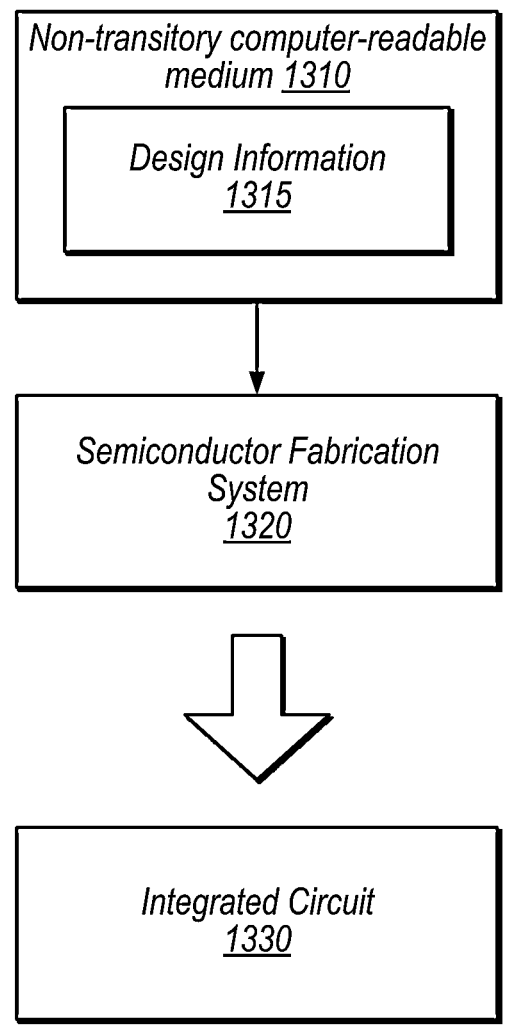
FIG. 13 is a block diagram illustrating an example computer-readable medium that stores circuit design information, according to some embodiments.

FIG. 13 is a block diagram illustrating an example non-transitory computer-readable storage medium that stores circuit design information, according to some embodiments. In the illustrated embodiment semiconductor fabrication system 1320 is configured to process the design information 1315 stored on non-transitory computer-readable medium 1310 and fabricate integrated circuit 1330 based on the design information 1315.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Non-transitory computer-readable storage medium 1310 may include two or more memory mediums which may reside in different locations, e.g., in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. Design information 1315 may be usable by semiconductor fabrication system 1320 to fabricate at least a portion of integrated circuit 1330. The format of design information 1315 may be recognized by at least one semiconductor fabrication system 1320. In some embodiments, design information 1315 may also include one or more cell libraries which specify the synthesis, layout, or both of integrated circuit 1330. In some embodiments, the design information is specified in whole or in part in the form of a netlist that specifies cell library elements and their connectivity. Design information 1315, taken alone, may or may not include sufficient information for fabrication of a corresponding integrated circuit. For example, design information 1315 may specify the circuit elements to be fabricated but not their physical layout. In this case, design information 1315 may need to be combined with layout information to actually fabricate the specified circuitry.

Integrated circuit 1330 may, in various embodiments, include one or more custom macrocells, such as memories, analog or mixed-signal circuits, and the like. In such cases, design information 1315 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 is configured to operate according to a circuit design specified by design information 1315, which may include performing any of the functionality described herein. For example, integrated circuit 1330 may include any of various elements shown in FIGS. 1B and 2-9. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic allays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a multi-chip module including a first graphics processor on a first semiconductor substrate and a second graphics processor on a second semiconductor substrate, wherein the first and second graphics processors are coupled to access graphics data via respective memory interfaces;
a shared workload distribution bus that includes:
one or more intra-substrate interfaces between respective sub-units of the first graphics processor on the first semiconductor substrate, wherein the one or more intra-substrate interfaces include a first number of wires configured to transmit data in parallel; and
at least one cross-substrate interface between the first and second semiconductor substrates, wherein the at least one cross-substrate interface includes a second number of wires configured to transmit data in parallel, wherein the second number of wires is smaller than the first number of wires;
workload distribution circuitry configured to transmit, via the shared workload distribution bus, control data that specifies graphics work for distribution to the first and second graphics processors, wherein the control data is distinct from the graphics data and the first and second graphics processors are also configured to transmit second control data to the workload distribution circuitry via the shared workload distribution bus; and
packet control circuitry configured to split a control data packet from at least one of the one or more intra-substrate interfaces for transmission as multiple packets via the cross-substrate interface;
wherein the first and second graphics processors are configured to:
retrieve the graphics data via one or more of the respective memory interfaces and not via the shared workload distribution bus, based on the control data received via the shared workload distribution bus, wherein the control data specifies graphics work that operates on the graphics data; and
execute the graphics work specified by the control data to operate on the retrieved graphics data.

2. The apparatus of claim 1, wherein the shared workload distribution bus connects the workload distribution circuitry to the first graphics processor and connects the first graphics processor to the second graphics processor such that the workload distribution circuitry is configured to communicate with the second graphics processor via the shared workload distribution bus connection to the first graphics processor.

3. The apparatus of claim 1, wherein the one or more intra-substrate interfaces are source synchronous based on a source reference clock and the cross-substrate interface is synchronous based on a shared reference clock.

4. The apparatus of claim 3, wherein circuitry of the shared workload distribution bus between the first and second graphics processors includes both source synchronous and synchronous communications circuitry and wherein the apparatus is configured to use one of the source synchronous and synchronous communications circuitry based on a strap signal.

5. The apparatus of claim 1, wherein the first and second graphics processors include respective arbitration circuitry configured to arbitrate between locally generated control data and control data generated by another graphics processor connected to the shared workload distribution bus.

6. The apparatus of claim 1, wherein the control data includes information indicating different workgroups distributed to the first and second graphics processors from a compute kernel, wherein the workgroups include instructions that operate on the graphics data retrieved via the one or more of the respective memory interfaces.

7. The apparatus of claim 1, wherein:
the graphics processors are arranged along the shared workload distribution bus according to a serial topology such that each graphics processor connected to the shared workload distribution bus is directly connected to at most two other graphics processors via the shared workload distribution bus; and
the at least one cross-substrate interface connects a pair of graphics processors in the serial topology.

8. The apparatus of claim 1, where a portion of the shared workload distribution bus connected to the first graphics processor includes:
an input switch for first control data from the first graphics processor;
an output switch for second control data to the first graphics processor;
packet switches configured to receive packets from other graphics processors on the shared workload distribution bus; and
a direction register configured to store an indication of a direction to the workload distribution circuitry via the shared workload distribution bus.

9. The apparatus of claim 1, wherein the shared workload distribution bus provides ordering of packets between pairs of graphics processors connected to the shared workload distribution bus but not among packets from different pairs of graphics processors.

10. The apparatus of claim 1, wherein the graphics processors are arranged along the shared workload distribution bus according to at least two groups, connected by distribution center circuitry located between graphics processors in ones of the at least two groups and wherein the distribution center circuitry included in at least two different groups is configured to communicate between the two different groups via a communications fabric that is shared with non-control data.

11. The apparatus of claim 1, wherein the first graphics processor is on a first power domain and a first clock domain and the second graphics processor is on a second power domain and a second clock domain.

12. A method, comprising:
transmitting, by workload distribution circuitry via a shared workload distribution bus, control data that specifies graphics work distribution to graphics processors on different semiconductor substrates including a first graphics processor on a first semiconductor substrate and a second graphics processor on a second semiconductor substrate, wherein the first and second semiconductor substrates are packaged in a multi-chip module, wherein:
the control data is distinct from graphics data retrieved via respective memory interfaces and the graphics processors are also configured to transmit control information to the workload distribution circuitry via the shared workload distribution bus; and
the transmitting is performed via both one or more intra-substrate interfaces between respective sub-units of the first graphics processor on the same semiconductor substrate and at least one cross-substrate interface between the different semiconductor substrates, wherein the at least one cross-substrate interface includes a smaller number of wires configured to transmit data in parallel than the one or more intra-substrate interfaces;
splitting, by packet control circuitry, control data packets from at least one of the one or more intra-substrate interfaces for transmission as multiple packets via the cross-substrate interface; and
retrieving, by the first and second graphics processors, the graphics data via one or more of respective memory interfaces and not via the shared workload distribution bus, based on the control data received via the shared workload distribution bus, wherein the control data specifies graphics work that operates on the graphics data; and
executing by the first and second graphics processors, the graphics work specified by the control data to operate on the retrieved graphics data.

13. The method of claim 12, wherein the transmission via the one or more interfaces is source synchronous based on a source reference clock and transmission via the cross-substrate interface is synchronous based on a shared reference clock.

14. The method of claim 13, further comprising controlling a selection signal to select from among source synchronous and synchronous communications circuitry of a portion of the shared workload distribution bus.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a multi-chip module including a first graphics processor on a first semiconductor substrate and a second graphics processor on a second semiconductor substrate, wherein the first and second graphics processors are coupled to access graphics data via respective memory interfaces;
a shared workload distribution bus that includes:
one or more intra-substrate interfaces between respective sub-units of the first graphics processor on the first semiconductor substrate, wherein the one or more intra-substrate interfaces include a first number of wires configured to transmit data in parallel; and
at least one cross-substrate interface between the first and second semiconductor substrates, wherein the at least one cross-substrate interface includes a second number of wires configured to transmit data in parallel, wherein the second number of wires is smaller than the first number of wires;
workload distribution circuitry configured to transmit, via the shared workload distribution bus, control data that specifies graphics work for distribution to the first and second graphics processors, wherein the control data is distinct from the graphics data and the first and second graphics processors are also configured to transmit second control data to the workload distribution circuitry via the shared workload distribution bus; and packet control circuitry configured to split a control data packet from at least one of the one or more intra-substrate interfaces for transmission as multiple packets via the cross-substrate interface;

wherein the first and second graphics processors are configured to:

retrieve the graphics data via one or more of the respective memory interfaces and not via the shared workload distribution bus, based on the control data received via the shared workload distribution bus, wherein the control data specifies graphics work that operates on the graphics data; and execute the graphics work specified by the control data to operate on the retrieved graphics data.

16. The non-transitory computer readable storage medium of claim 15, wherein the one or more intra-substrate interfaces are source synchronous based on a source reference clock and the cross-substrate interface is synchronous based on a shared reference clock.

17. The non-transitory computer readable storage medium of claim 15, wherein the first and second graphics processors include respective arbitration circuitry configured to arbitrate between locally generated control data and control data generated by another graphics processor connected to the shared workload distribution bus.

* * * * *